(12) United States Patent
San Martin et al.

(10) Patent No.: US 9,971,058 B2
(45) Date of Patent: May 15, 2018

(54) CORRECTION OF GALVANIC TOOL DATA TO ACCOUNT FOR RUGOSITY AND CAVE EFFECT

(71) Applicant: Halliburton Energy Services, Inc., Houston, TX (US)

(72) Inventors: Luis Emilio San Martin, Houston, TX (US); Ahmed E. Fouda, Houston, TX (US); David Torres, Humble, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 88 days.

(21) Appl. No.: 15/125,799

(22) PCT Filed: Dec. 22, 2015

(86) PCT No.: PCT/US2015/067313
§ 371 (c)(1),
(2) Date: Sep. 13, 2016

(87) PCT Pub. No.: WO2017/111938
PCT Pub. Date: Jun. 29, 2017

(65) Prior Publication Data
US 2018/0017701 A1    Jan. 18, 2018

(51) Int. Cl.
*E21B 44/00* (2006.01)
*E21B 47/08* (2012.01)
(Continued)

(52) U.S. Cl.
CPC ............... *G01V 3/38* (2013.01); *E21B 44/00* (2013.01); *E21B 47/08* (2013.01); *E21B 49/00* (2013.01);
(Continued)

(58) Field of Classification Search
CPC .......... E21B 44/00; E21B 47/08; E21B 47/18; E21B 49/00
See application file for complete search history.

(56) References Cited

U.S. PATENT DOCUMENTS

| 5,019,708 A | 5/1991 | Flaum |
| 5,502,686 A * | 3/1996 | Dory ............ G01V 11/00 175/40 |

(Continued)

OTHER PUBLICATIONS

"International Application Serial No. PCT/US2015/067313, International Search Report dated Aug. 24, 2016", 3 pgs.

(Continued)

*Primary Examiner* — Daniel P Stephenson
(74) *Attorney, Agent, or Firm* — Gilliam IP PLLC (57) ABSTRACT

Apparatus, systems, and methods may operate to detect rugosity in a borehole. Additional activity may include generating a rugosity correction, responsive to detecting rugosity in the borehole, by finding an effective borehole diameter, consistent with the presence of rugosity, for which a simulation of a model of the borehole using the effective borehole diameter generates simulation resistivity measurements that match, within a tolerance, resistivity measurements before execution of a borehole correction algorithm. Additional activity may include applying rugosity correction by generating resistivity logs, using the effective borehole diameter, that are corrected for rugosity and borehole effect. Additional apparatus, systems, and methods are disclosed.

20 Claims, 8 Drawing Sheets

(51) Int. Cl.
*E21B 49/00* (2006.01)
*G01V 3/18* (2006.01)
*G01V 3/38* (2006.01)
*G01V 9/00* (2006.01)
*E21B 47/18* (2012.01)

(52) U.S. Cl.
CPC ............... *G01V 3/18* (2013.01); *G01V 9/00* (2013.01); *E21B 47/18* (2013.01)

(56) References Cited

U.S. PATENT DOCUMENTS

| | | | | |
|---|---|---|---|---|
| 6,353,322 | B1* | 3/2002 | Tabarovsky | G01V 3/20 324/358 |
| 6,381,542 | B1 | 4/2002 | Zhang et al. | |
| 6,600,321 | B2* | 7/2003 | Evans | E21B 47/0002 175/50 |
| 6,714,014 | B2* | 3/2004 | Evans | G01V 3/24 324/355 |
| 7,579,841 | B2* | 8/2009 | San Martin | G01V 3/24 324/366 |
| 7,696,756 | B2* | 4/2010 | Morys | G01V 3/24 324/366 |
| 8,183,863 | B2* | 5/2012 | Goodman | G01V 3/24 324/303 |
| 8,299,796 | B2* | 10/2012 | San Martin | G01V 3/24 324/303 |
| 9,709,692 | B2* | 7/2017 | Itskovich | G01V 3/20 |
| 2004/0046559 | A1 | 3/2004 | Flanagan | |
| 2007/0046291 | A1 | 3/2007 | Itskovich | |
| 2008/0303525 | A1* | 12/2008 | Itskovich | G01V 3/24 324/351 |
| 2014/0324353 | A1 | 10/2014 | Hou et al. | |
| 2018/0017701 | A1* | 1/2018 | San Martin | G01V 3/38 |

OTHER PUBLICATIONS

"International Application Serial No. PCT/US2015/067313, Written Opinion dated Aug. 24, 2016", 6 pgs.

* cited by examiner

CORRECTION OF GALVANIC TOOL DATA TO ACCOUNT FOR RUGOSITY AND CAVE EFFECT

PRIORITY APPLICATIONS

This application is a U.S. National Stage Filing under 35 U.S.C. § 371 from International Application No. PCT/US2015/067313, filed on Dec. 22, 2015, which application is incorporated herein by reference in its entirety.

BACKGROUND

Understanding the structure and properties of geological formations often reduces the cost of drilling and production of oil and gas wells. Measurements are typically performed in a borehole (i.e., downhole measurements) in order to attain this understanding. To obtain such measurements, a variety of sensors and mounting configurations may be used.

For example, resistivity tools are widely used in oil field exploration applications for determining zones in a formation that may contain hydrocarbons. Accurate determination of the formation resistivity is useful in assessing the feasibility of production for a particular well. However, resistivity measured by the tool is often affected by factors other than the formation resistivity. For example, the presence of the borehole itself, as well as invasion zones, may change the measurement values. In addition, caving and rugosity can distort shallow resistivity measurements.

DETAILED DESCRIPTION

To address some of these challenges, as well as others, apparatus, systems, and methods are described herein that improve resistivity measurement accuracy in a formation, such as when rugosity is present. In some embodiments, this is the result of implementing a novel approach for performing data correction as a part of radial inversions of the measured resistivity data. In this way, array type resistivity tools can be used to obtain a radial resistivity profile and thereafter, formation and invasion properties can be more accurately determined using the methods described herein.

To begin to understand the problem, it is noted that array type resistivity tools often have different modes of operation, associated with different depths of investigation. Data from these different modes are used to obtain a radial resistivity profile and hence, formation and invasion properties using inversion. Laterolog type tools are a useful subgroup of resistivity tools whose working principle is based on injecting current into the formation and estimating formation resistivity from the resulting voltage differences on a number of electrodes. Descriptions in this document will focus on array laterolog measurements, although the apparatus, systems, and methods described can easily be extended to other array resistivity tools, including induction type tools.

In some cases, such as when there is caving or rugosity or when the borehole is large, shallow measurement modes of an array laterolog tool may tend toward measuring characteristics of the mud fluid, instead of the formation. This reduced sensitivity to the formation is further exacerbated when the difference between formation resistivity ($R_t$) and mud resistivity ($R_m$) is relatively large. In such cases, measurements using shallow modes can differ significantly compared to those obtained using deeper modes. All such measurements may influence the values of associated borehole-corrected resistivities.

Figure 1:
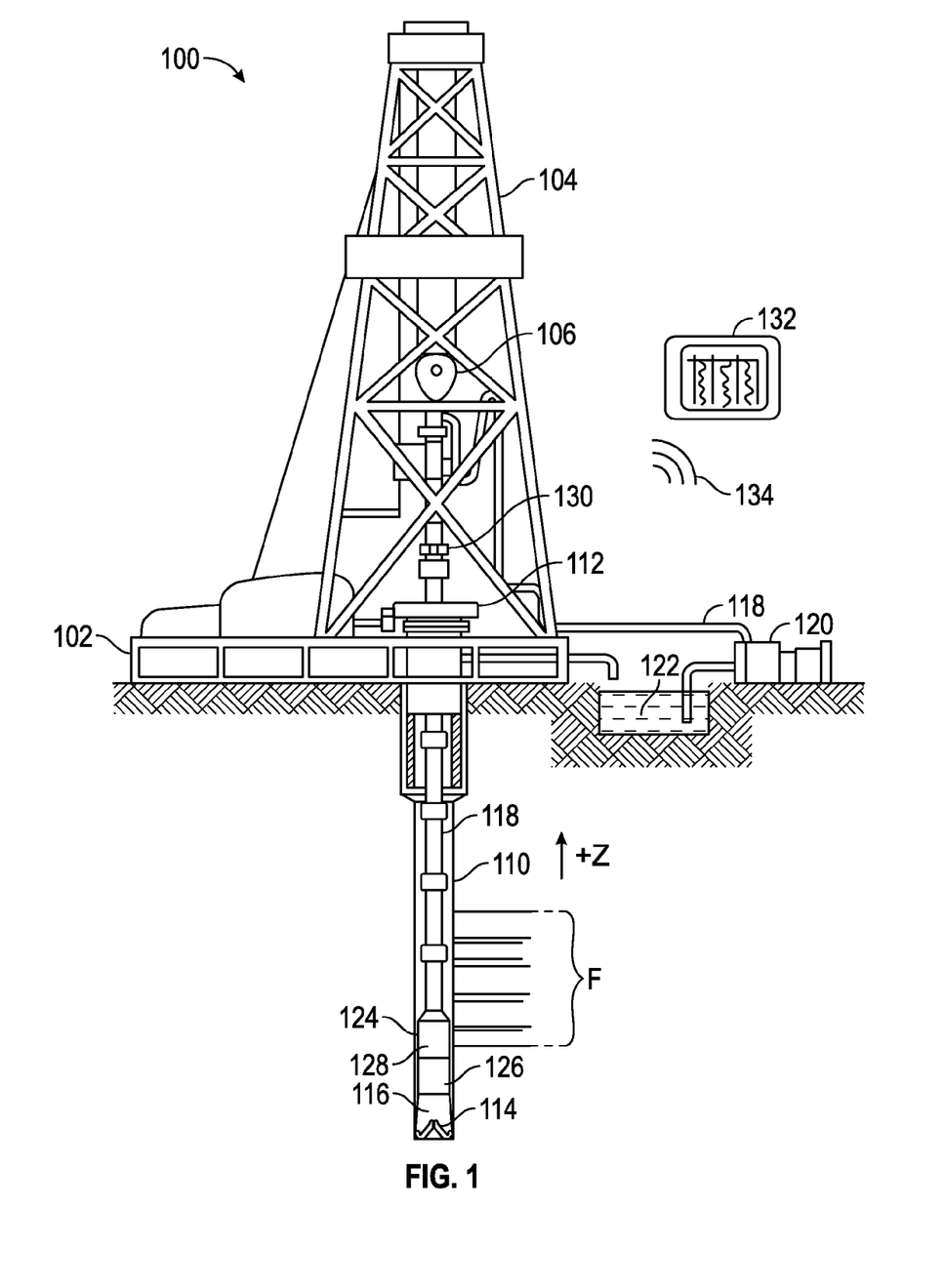
FIG. 1 illustrates an example logging while drilling (LWD) or measuring while drilling (MWD) system in which some embodiments can be implemented.

The tools and methods disclosed herein are best understood in the context of the larger systems in which they operate. Accordingly, FIG. 1 illustrates an example logging while drilling (LWD) or measuring while drilling system 100. A drilling rig or platform 102 supports a derrick 104 or other supporting structure, such as including or coupled to a hoist 106. The hoist 106 is used for raising or lowering equipment or other apparatus such as drill string 108. The drill string 108 accesses a borehole 110, also known as a wellbore, such as through a wellhead 112. The borehole 110 may be drilled in any direction, for example, vertical, inclined, horizontal, and combinations thereof. The lower end of the drill string 108 includes various apparatus, such as a drill bit 114, to provide the borehole 110. A downhole motor assembly 116 rotates the drill bit 114. As the drill bit 114 rotates, it extends the borehole 110 that passes through various subsurface formations F. The downhole motor assembly 116 may include a rotary steerable system (RSS) that enables the drilling crew to steer the borehole 110 along a desired path.

Drilling fluid or "mud" circulates in the annular region around the drill bit 114 or elsewhere, such as provided to the borehole 110 through a supply pipe 118, circulated by a pump 120, and returning to the surface to be captured in a retention pit 122 or sump. The drilling fluid transports cuttings from the borehole 110 into the retention pit 122 and aids in maintaining the borehole 110 integrity.

The drill bit 114 and downhole motor assembly 116 form a portion of a bottom hole assembly (BHA) 124 that includes one or more drill collars (thick-walled steel pipe) to provide weight and rigidity to aid the drilling process. Some of these drill collars include built-in logging instruments to gather measurements of various drilling parameters such as position, orientation, weight-on-bit, borehole diameter, etc.

Some of these drill collars include calipers (e.g., acoustic calipers) for measuring the diameter or area of the borehole.

Various subs or tool assemblies may also be located along the drill string 108 and/or in the BHA 124. As the BHA 124 passes through various regions of the formation F, information may be obtained. For example, the BHA 124 may include a borehole imaging tool 126 that collects measurements relating to various formation properties as well as the tool orientation and/or other drilling conditions. As the drill bit 114 extends the borehole 110 through the subsurface formations F, the borehole imaging tool 126 collects measurements for use in determining an apparent formation F resistivity.

A telemetry sub 128 is included in the BHA 124 to provide a communications link with the surface. The telemetry sub 128 includes wireless telemetry or logging capabilities, or both, such as to transmit or later provide information indicative of a formation resistivity to operators on the surface or for later access in evaluation of formation F properties. Mud pulse telemetry is one common telemetry technique for transferring tool measurements to a surface interface 130 and to receive commands from the surface interface 130, but other telemetry techniques can also be used. For example, the surface interface 130 includes one or more of wireless telemetry, processor circuitry, or memory facilities, such as to support log-while-drilling (LWD) or measurement-while-drilling (MWD) operations.

A surface processor, shown in FIG. 1 in the form of a computer 132, communicates with surface interface 130 via a wired or wireless network communications link 134, and provides a graphical user interface (GUI) or other form of interface that enables a user to provide commands and to receive and optionally interact with a visual representation of the acquired measurements. The surface processor can take alternative forms, including a desktop computer, a laptop computer, an embedded processor, a cloud computer, a central processing center accessible via the internet, and any combination of the foregoing.

Figure 2:
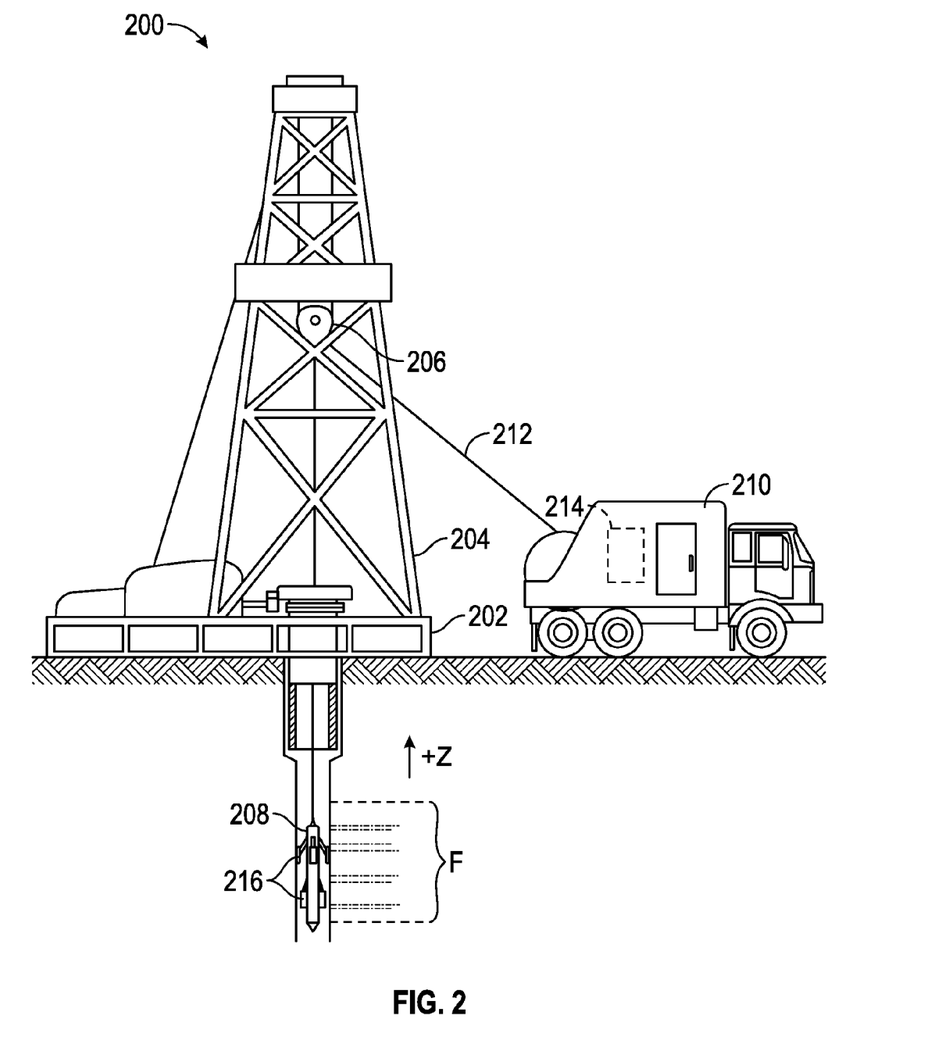
FIG. 2 illustrates an example wireline system in which some embodiments can be implemented.

At various times during the drilling process, the drill string 108 may be removed from the borehole, allowing wireline logging operations to be conducted in a wireline logging system 200 as shown in FIG. 2. A platform 202, such as coupled to a derrick 204, includes a hoist 206 that is used to raise or lower equipment such as a wireline logging tool 208, such as a wireline sonde, into or out of a borehole. In this wireline example, a logging facility 210 (e.g., logging truck) suspends the wireline logging tool 208 on a wireline cable 212 providing a communicative coupling between the wireline logging tool 208 and the logging facility 210.

Measurements from the formation F may be obtained, such as using a galvanic tool included as at least a portion of the wireline logging tool 208. The galvanic tool may comprise, for example, an array laterolog. The measurements include resistivity measurements of the formation F. The wireline cable 212 includes conductors for transporting power to the tool and telemetry from the tool to the surface, where the logging facility 210 includes a processor 214 (e.g., a computer or other storage or control circuitry) that acquires and stores measurement data from the wireline logging tool 208. The wireline logging tool 208 may have pads and/or centralizing springs to maintain the tool near the axis of the borehole as the tool traverses the borehole. In one embodiment, the wireline logging tool 208 includes a borehole imaging portion having sensing pads 216 which are mounted on devices that press the sensing pads 216 against the borehole wall.

The borehole imaging tool 126 or the wireline logging tool 208 collects formation impedance measurements (e.g., resistivity, conductivity, reactance, or complex impedance) that are associated with distance Z along the borehole and at an azimuthal angle around the borehole 110 to provide a borehole wall image.

For purposes of illustration, the examples of FIGS. 1 and 2 show a vertically-oriented borehole configuration. However, the apparatus and techniques described herein may also be used in other borehole configurations, such as a borehole including a horizontal penetration direction, or an oblique borehole configuration, for example. The examples of FIGS. 1 and 2 also generally illustrate land-based examples. Alternatively, the apparatus and techniques described herein may be used in offshore environments as well, such as for subsea operations. In particular, offshore or subsea operations may include use of wireline or LWD/MWD apparatus and techniques including aspects of the examples herein.

Figure 3:
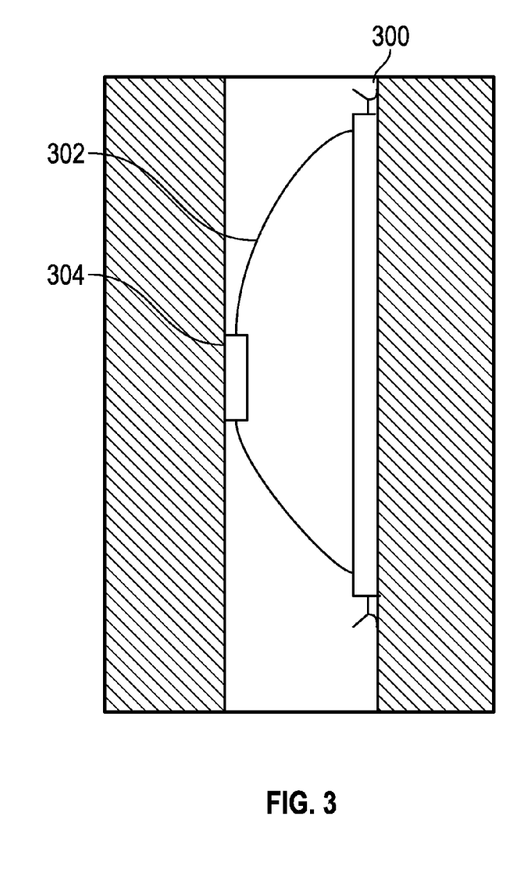
FIG. 3 is a cross-sectional view of a cylindrical borehole wall for purposes of comparison with a rugose borehole wall.

Rugosity effect is the error in formation resistivity induced by the irregularities of the borehole wall, which become an obstacle for an accurate borehole correction. Normally, the evaluation of the borehole correction is made under the assumption that the borehole is a cylinder of fixed radius. The correction thus calculated is evaluated and applied to the measured data. FIG. 3 is a cross-sectional view of a cylindrical borehole wall 300 for purposes of comparison to a rugose borehole wall. Tools, for example a caliper tool 302, having a caliper pad 304 can measure the borehole diameter with an adequate level of accuracy.

Figure 4:
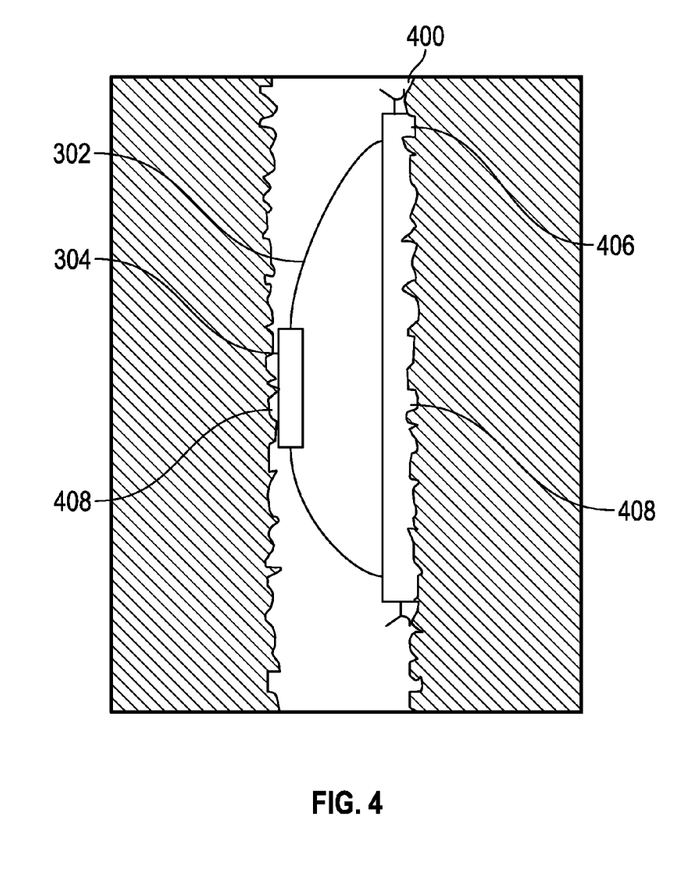
FIG. 4 is a cross-sectional view of a rugose borehole wall for the purpose of illustrating some embodiments.

FIG. 4 is a cross-sectional view of a rugose borehole wall 400 for the purpose of illustrating some embodiments. As shown in FIG. 4, the rugose borehole wall 400 can include irregularities 406, 408, caused by borehole rugosity, such that the borehole diameter cannot be effectively measured by the caliper tool 302. For example, if the caliper pad 304 has a relatively large surface in comparison to the variation in borehole surface (in some examples, the caliper pad 304 will have a diameter of approximately 1 foot), the caliper tool 302 will generate inaccurate measurements of the borehole diameter at varying spots. For example, the caliper tool 302 may underestimate borehole diameter or measure a lower-than-accurate borehole diameter at 408, because the caliper pad 304 is too large to measure the increased diameter caused by rugosity at 408. Methods in accordance with some embodiments may include operations such as measuring a borehole diameter with a caliper tool 302 having a caliper pad 304 length, wherein rugosity is defined with reference to the caliper pad 304 length such that rugosity is defined to exist if the rugose feature is smaller than the caliper pad 304 length. In some embodiments, the rugosity is further defined with reference to the caliper pad 304 length such that the rugosity is defined to exist if the rugose feature is larger than a selected percentage of the caliper pad 304 length. This percentage can be specified to vary based on the apparent diameter of the borehole, or the predicted diameter of the borehole, for example.

Some embodiments will correct for rugosity effect for rugosity features that cannot be detected by caliper tools 302 as described above. Various embodiments correct for rugosity effect in the presence of rugosity features that are in the range of about 2-11 inches, depending on the borehole diameter, borehole fluid conductivity, or other factors. It is expected that rugosity features below a length of, e.g., about 20% of the borehole diameter, will not have a large effect on accuracy of resistivity measurements in most array laterolog tools. However, this expectation can vary in conditions in which borehole fluid is highly conductive.

The rugosity effect on the measurements (e.g., resistivity measurements, represented as curves) of an array laterolog can vary depending on the depth of investigation of the different curves. Array laterolog tools are generally operated such that voltages at (or voltage differences between) monitor electrodes are measured as a function of the current emitted from different combinations of guard electrodes, and these different combinations can be referred to as modes, with different depths of investigation.

Figure 5A:
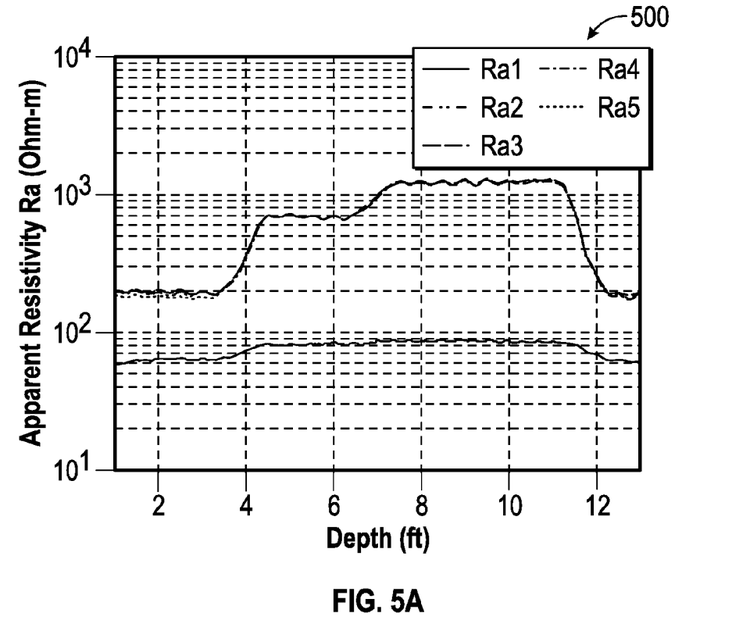
FIG. 5A is a graph of synthetic measured apparent resistivities in which shallow mode results differ significantly from deeper mode results.

As the contrast between borehole resistivity and formation resistivity increases, the rugosity effect could be significant for the shallow modes and negligible on the deeper modes. For example, FIG. 5A is a graph of synthetic measured apparent resistivities in which shallow mode results differ significantly from deeper mode results. In examples, this difference can be caused by a rugosity effect. FIG. 5A illustrates apparent resistivities Ra1-Ra5 (corresponding to modes 1 to 5) as measured by a laterolog tool. The graph 500 clearly shows problematic results for mode 1 (corresponding to Ra1), which may be considered as the shallowest mode of all available measurement modes. This is apparent to those of ordinary skill in the art, due to widely diverging measurement values of mode 1 (corresponding to Ra1), and modes 2-5 (corresponding to Ra2-Ra5). This resulting variation in value, over a range of almost 10:1, is not desirable, since it is difficult to interpret. It may lead the end user to be unsure as to whether the results for mode 1 are accurate, or erroneous.

Figure 5B:
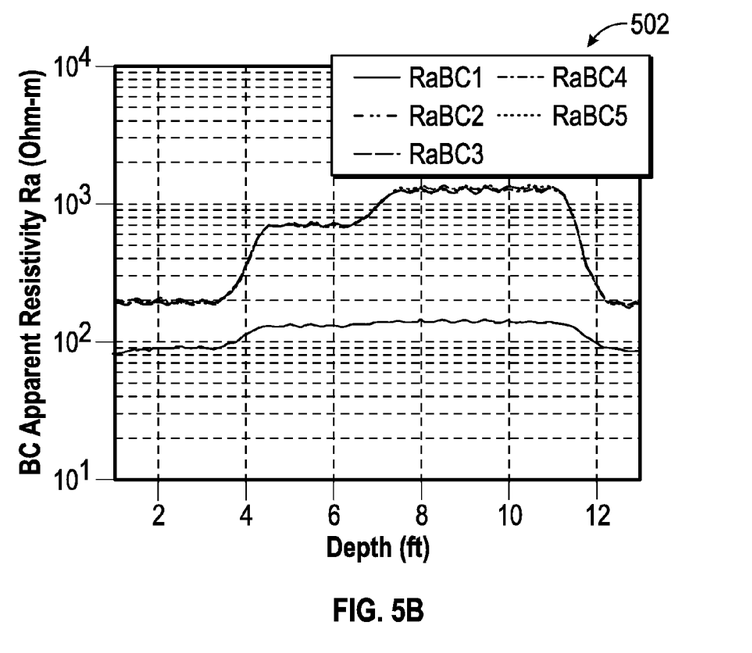
FIG. 5B is a graph of borehole corrected apparent resistivities in which shallow mode results differ significantly from deeper mode results.

FIG. 5B is a graph 502 of borehole corrected apparent resistivities in which shallow mode results differ significantly from deeper mode results. Apparent resistivity RaBC values (e.g., curves RaBC1-RaBC5) are shown for each of Modes 1-5. It is apparent that borehole correction did not correct the problem shown for Mode 1 (corresponding to curve RaBC1). As a result, the log in this case appears erroneous, and the end user would be unsure of the accuracy of the measurements.

As will be appreciated upon examination of FIGS. 5A and 5B, the shallowest mode (corresponding to Ra1) is affected by the rugosity effect to the point that Ra1 does not correlate well with the other curves (corresponding to Ra2-Ra5) or with the formation resistivity. The rugosity effect is caused by an imperfect borehole correction, which affects mostly the shallower modes because for those modes the borehole effect can be a significant portion of the measured signal.

The borehole correction shown in FIG. 5B did not work as expected because the correction used a caliper-measured borehole size, leading to inaccurate results. For example, the caliper-measured borehole diameter may be about 8.5 inches in some embodiments, whereas, when adjusted for rugosity, the true or physical borehole diameter could be about 9.08 inches, due to the inability of the caliper pad 304 (FIG. 4) to adjust for increased diameter created by irregularities in the rugose borehole wall.

Methods in accordance with embodiments describe herein provide rugosity correction to improve the accuracy of the shallow modes whenever contrast between borehole mud resistivity and formation resistivity is high and when the presence of rugosity affects the accuracy of the shallow modes.

Figure 6:
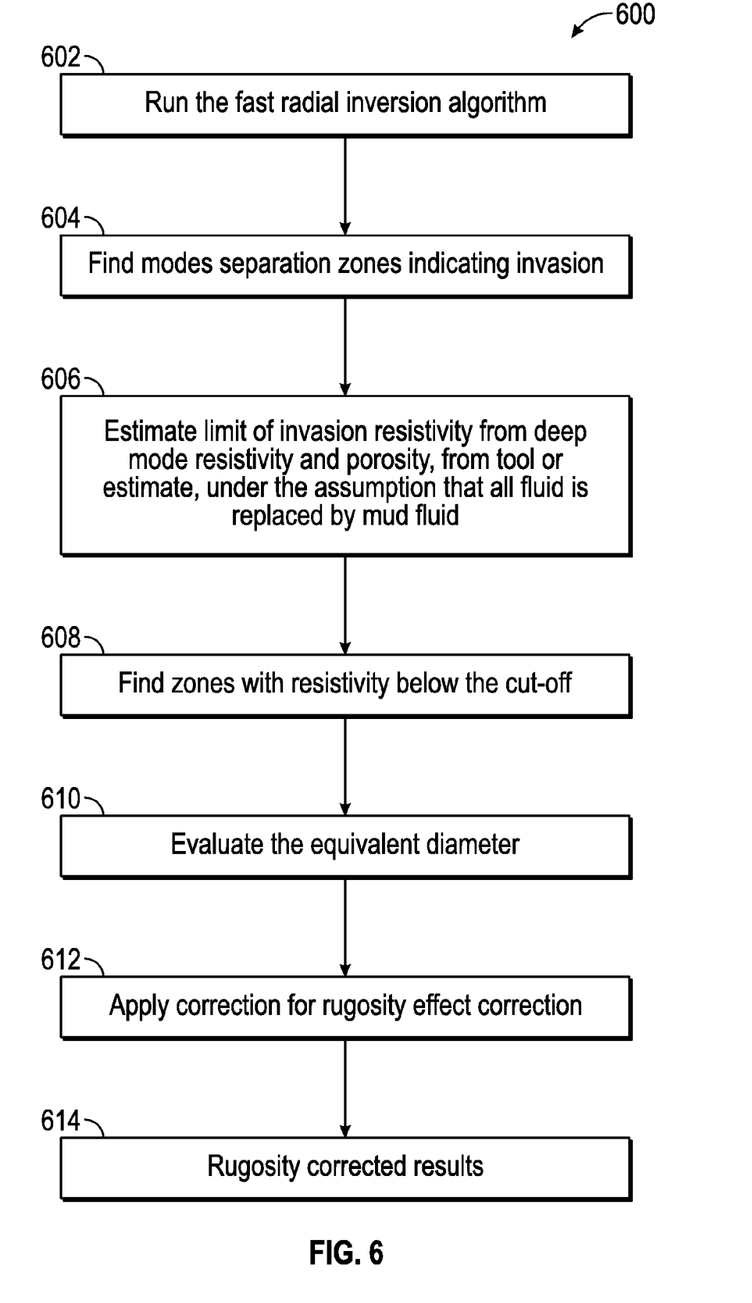
FIG. 6 is a flowchart illustrating an example method for correction of rugosity effect in data of an array laterolog in accordance with some embodiments.

FIG. 6 is a flowchart illustrating an example method 600 for correction of rugosity effect in data of an array laterolog in accordance with some embodiments. Some operations of example method 600 can be performed by a computer 132 (FIG. 1), logging facility 210 (FIG. 2), processing unit 1020 (FIG. 10) or other system, computer, or processing component.

Example method 600 begins with operation 602 with the computer 132 or logging facility 210 performing an operation, for example a fast radial inversion, on the data generated by the array laterolog. For example, the computer 132 or logging facility 210 may perform fast radial inversion of the apparent resistivity for focused modes described earlier herein. A 1D formation model with invasion is commonly used in modeling resistivity tools, and in inverting the data obtained from such tools. The inversion process involves taking the measured apparent resistivities provided by a resistivity tool, and matching them to the apparent resistivities generated by a forward model of the formation, using an assumed profile. The forward model thus takes variables such as $R_t$ (formation resistivity), $R_m$ (mud resistivity), $d_{ecc}$ (eccentricity), $R_{xo}$ (invasion resistivity), $d_{xo}$ (invasion radius), and caliper size values as inputs to produce a numerical estimate of $R_a$ (apparent resistivity) that should be measured by the tool under those conditions.

As is known to those of ordinary skill in the art, a variety of techniques exist to perform numerical inversion, most of which are well-documented in the literature. The techniques described herein are applicable to any such method, including those that implement a table look-up or an iterative solution.

The output of operation 602 can be used for detecting rugosity in a borehole. In operation 604, the computer 132 or logging facility 210 will detect zones of possible invasion. In operation 606, the computer 132 or logging facility 210 can estimate limits or parameters for detecting which of those zones of possible invasion (detected in operation 604) are actually areas of rugosity, rather than invasion. For example, the computer 132 or logging facility 210 can perform operations including detecting sections of the borehole in which a radius of invasion into the borehole is below a threshold radius, a condition that indicates possibility rugosity. Because true formation invasions typically invade the formation by at least a certain diameter (at least six inches or so, but typically in the range of 2-12 feet, depending on the mud and properties of porosity of the formation), any smaller apparent invasion, especially a smaller invasion with a resistivity close to the borehole mud resistivity, is likely to be a rugosity feature rather than a true invasion. Accordingly, the threshold radius for use in detecting rugosity may be about six inches, below which the apparent invasion will be determined to be rugosity rather than an invasion if the invasion resistivity is close to mud conductivity.

In addition to the radius of invasion, the presence of other conditions can also indicate presence of rugosity. For example, rugosity may be present in a zone when apparent invasion resistivity in that zone is sufficiently close to borehole mud resistivity to make it unlikely to be an invaded zone based on petro-physics estimation. The computer 132 or logging facility 210 can perform operations including determining a lower limit of invasion resistivity for use in detecting rugosity based on rock properties of the formation and on deep mode resistivity. For example, the computer 132 or logging facility 210 will detect rugosity when the measured resistivity at a suspected area of invasion is less than the lower limit of invasion resistivity as defined by formation resistivity estimates given by assumptions or knowledge regarding the porosity of the formation. When resistivity in a suspected invasion zone is below the limit of invasion resistivity, this would indicate that the suspected invasion zone is, in fact, rugosity rather than a true invasion zone.

The computer 132 or logging facility 210 can obtain porosity parameters or values from the measurements of tools run in combination with the laterolog or from approximate estimates based on geographical knowledge, historical data, etc. For example, in some embodiments, the lowest value of invasion resistivity is given by the apparent resistivity of the deep mode corrected for borehole effect with maximum reasonable (e.g., predictable or known) porosity estimate based on known information about the formation, with a percentage of that porosity filled with borehole fluid. The computer 132 or logging facility 210 can assume that invasion resistivity below this value is caused by rugosity or cave effect and the computer 132 or logging facility 210 can correct raw data accordingly.

Figure 7A:
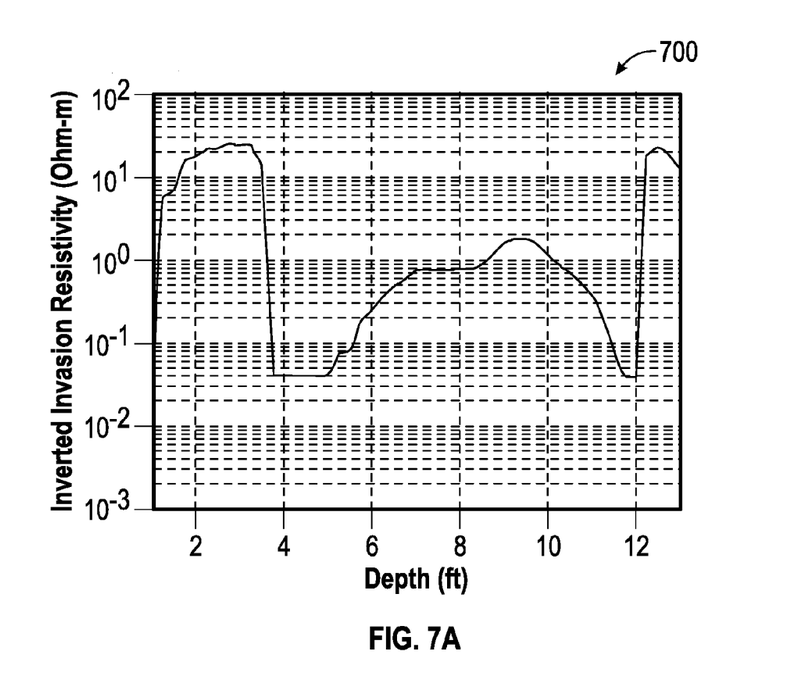
FIG. 7A is a graph of inverted invasion resistivity values for purposes of illustrating various embodiments.
Figure 7B:
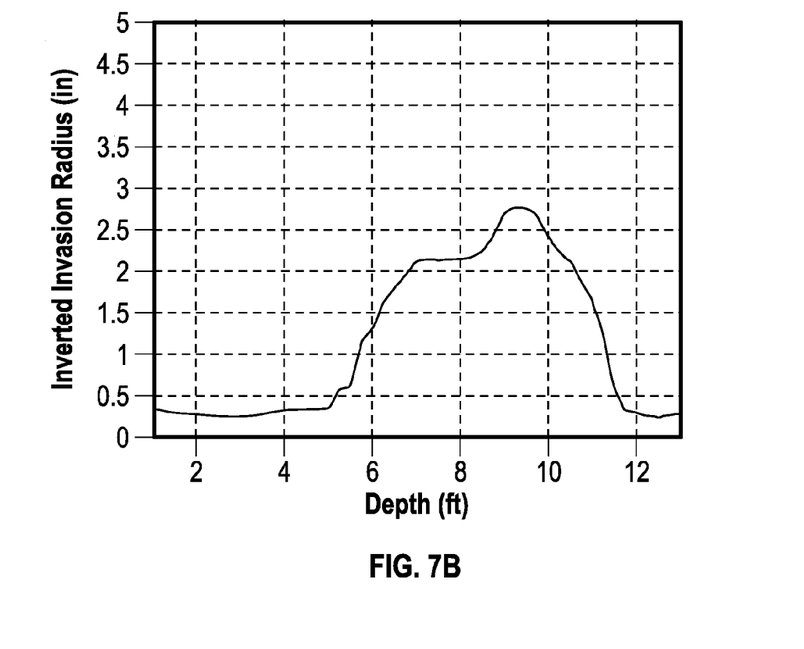
FIG. 7B is a graph of inverted invasion radius values for purposes of illustrating various embodiments.

FIGS. 7A and 7B illustrate conditions (such as those detected or measured in operations 602 and 604) that indicate presence of rugosity. FIG. 7A is a graph of inverted invasion resistivity values for purposes of illustrating various embodiments, and FIG. 7B is a graph of inverted invasion radius values for purposes of illustrating various embodiments. As can be seen in FIGS. 7A and 7B, the invasion is shallow and the invasion resistivity is close to the resistivity of the borehole mud (about 0.5 Ohm-m) in zones between 2 and 12 feet. These two conditions together indicate presence of rugosity.

The example method 600 continues with operation 608 with the computer 132 or logging facility 210 finding zones of possible invasion that have resistivity below the thresholds defined in operation 606, and thereby determining that those zones are zones of rugosity.

Once the zones affected by rugosity effect have been identified, the example method 600 continues with operation 610 with the computer 132 or logging facility 210 finding an effective borehole diameter, responsive to detecting rugosity in the borehole. The computer 132 or logging facility 210 determines the effective borehole diameter, consistent with the presence of rugosity, for which a simulation of a model of the borehole generates simulation resistivity measurements that match resistivity measurements before execution of a borehole correction algorithm. The match can be determined within a tolerance, for example, the computer 132 or logging facility 210 can determine there is a match, and rugosity correction has been attained, when the simulation matches resistivity measurements before application of borehole correction, within a range of 5%, 1%, or other criteria or tolerances.

Figure 8:
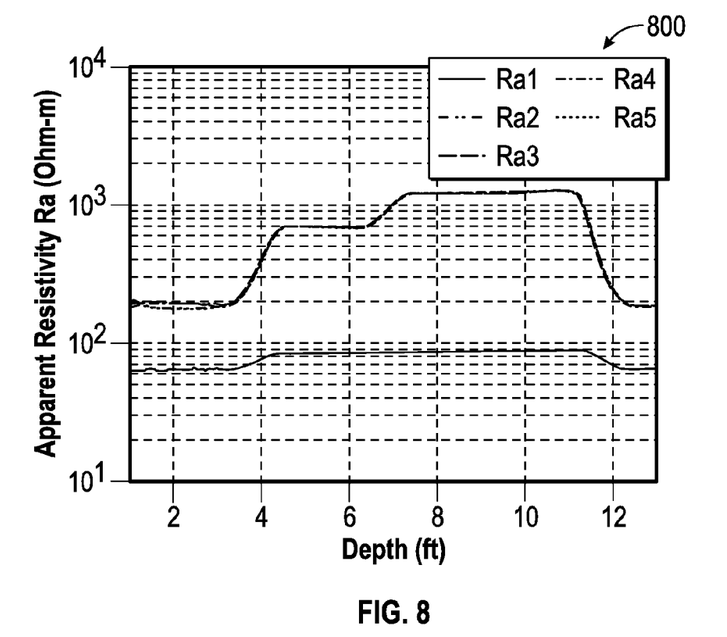
FIG. 8 is a graph of processed data generated for apparent resistivities using an effective borehole diameter in accordance with various embodiments.

The computer 132 or logging facility 210 can set an initial estimate for the effective borehole radius that takes into account rugosity. This effective borehole radius will be larger than the apparent borehole radius that was measured using calipers as described earlier herein (FIGS. 2 and 3). FIG. 8 is a graph of raw data generated for apparent resistivities using an effective borehole diameter in accordance with various embodiments. The computer 132 or logging facility 210 determines that the correct effective borehole radius has been arrived at when the raw data evaluated with the effective borehole radius (FIG. 8) matches (within a tolerance or percentage set by the computer 132, logging facility 210, or other system) apparent resistivity curves before correction for borehole effect using the apparent borehole radius evaluated with calipers (FIG. 5A).

Once the computer 132 or logging facility 210 evaluates the effective borehole diameter, in operation 612, the computer 132 or logging facility 210 proceeds by applying rugosity correction by generating resistivity logs that are corrected for borehole effect using the effective borehole diameter in appropriate borehole correction algorithms. The computer 132 or logging facility 210 applies the effective borehole diameter to remove the rugosity effect from the shallow modes (e.g., corresponding to Ra1, FIG. 5A) of the array laterolog.

Referring again to FIG. 6, in operation 614, the computer 132 or logging facility 210 provides rugosity-corrected results, for example, corrected resistivity measurements or resistivity logs. In embodiments, the computer 132 or logging facility 210, or any component shown in FIG. 10 (e.g., the controller 1025) can perform operations including controlling a drilling operation based on the resistivity logs that have been corrected for rugosity and borehole effect.

Figure 9:
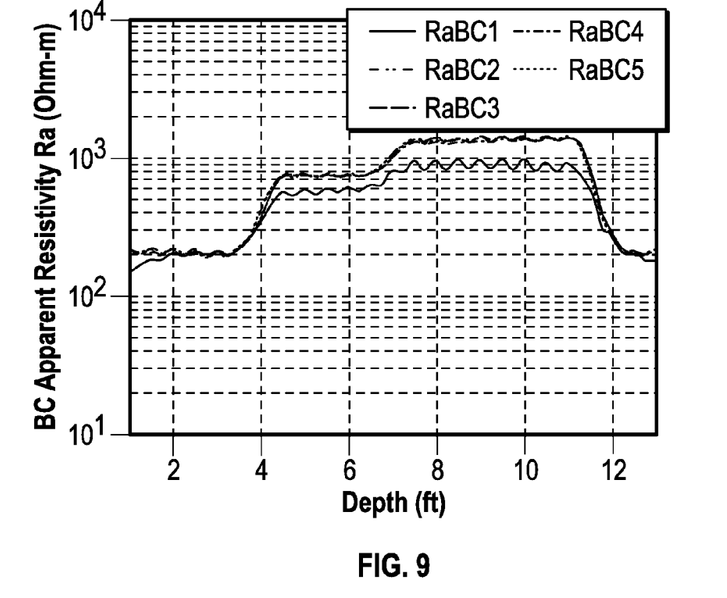
FIG. 9 illustrates the effect of applying borehole correction using the effective borehole diameter in accordance with various embodiments.

FIG. 9 illustrates the effect of applying borehole correction using the effective borehole diameter in accordance with various embodiments. As can be seen, the shallow mode (corresponding to RaBC1) is now closer to the other curves corresponding to deeper modes (relative to FIG. 5B, which does not include correction for rugosity effect), indicating that rugosity effect has been corrected for. In FIG. 9 the borehole-corrected apparent resistivities are processed using an inversion with rugosity effect correction as described in various embodiments. It can be seen in FIG. 9 that correct readings for Mode 1 (corresponding to curve RaBC1) are recovered almost perfectly. The result is a log that is easy to interpret; one that confirms the accuracy of the measurement, instead of creating doubt. Accordingly, methods in accordance with various embodiments can include inspecting resistivity curves (e.g., curves RaBC1-RaBC5, FIG. 9) generated using the effective borehole diameter, and determining that rugosity correction accounts for rugosity in the borehole when resistivity curves for each measurement depth match within a range of each other. In embodiments, the shallow mode (e.g., RaBC1) and deeper modes (e.g., RaBC2-RaBC5) will correspond within a tolerance of about 1%. Operators can repeat any or all of the operations of example method 600 as production proceeds, any time rugosity is detected or any time operators detect that borehole correction is not leading to accurate results, according to criteria described earlier herein.

The computer 132 or logging facility 210 can apply procedures similar to the operations of example method 600, to perform cave correction. Example methods described herein can help improve the logs affected by inaccurate caliper measurement of the borehole diameter. By improving the response of the shallowest mode of an array laterolog tool, operators can improve the characterization of the formation resistivity of the array laterolog to gain a better understanding of formations. Methods and apparatuses in accordance with various embodiments can correct possible errors in the caliper measurement of the borehole diameter. Operators can apply these corrections in real time or post-processing at the well site.

Figure 10:
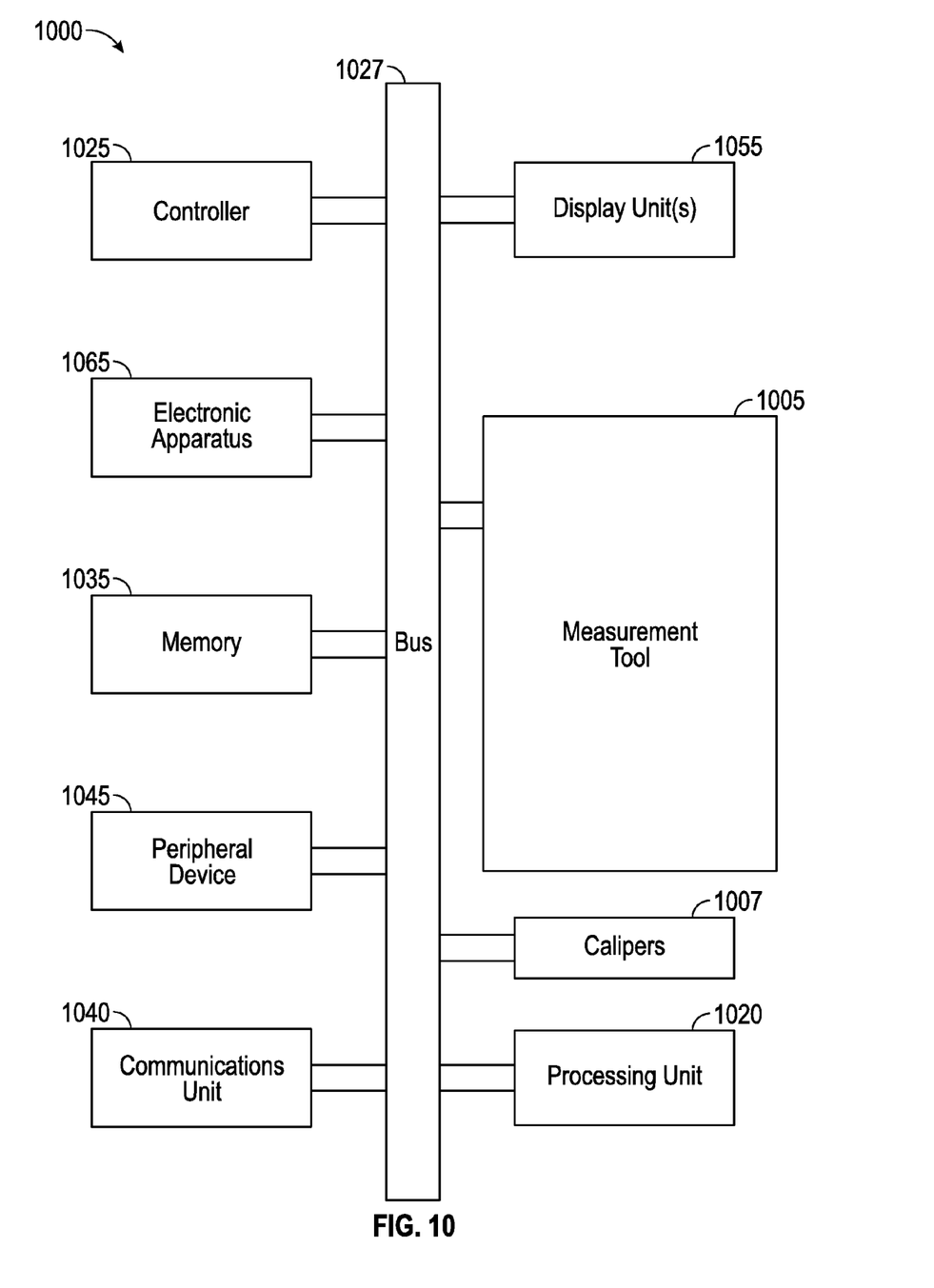
FIG. 10 depicts a block diagram of features of a logging system, according to various embodiments.

FIG. 10 depicts a block diagram of features of an example system 1000 having a processing unit and a tool to operatively evaluate rugosity effects in tool measurements. System 1000 includes a processing unit 1020 communicatively coupled to one or more measurement tools 1005, such as a galvanic tool (e.g., array laterolog) or induction-type tool as described herein. The processing unit 1020 can be included in, or can include some components of, the computer 132 or logging facility 210 described earlier herein. Accordingly, the processing unit 1020 can perform some or all of the functionalities described above with reference to FIGS. 1-9. Processing tool measurements provided by the measurement tool 1005 provides measurements such that the processing unit 1020 can determine geological structural information that takes into account rugosity effects. The system 1000 can include a caliper system 1007 including a caliper pad having a caliper pad length for measuring apparent borehole diameter as described earlier herein with reference to FIGS. 3 and 4.

The system 1000 can also include a controller 1025, a memory 1035, an electronic apparatus 1065, and a communications unit 1040. Controller 1025, memory 1035, and communications unit 1040 can be arranged to control operation of the measurement tool 1005 in a manner similar or identical to a processing unit 1020 discussed herein. Various components of system 1000 can operate together as a processing unit to provide control and processing for the LWD tool to process, correlate, associate, model, and evaluate a plurality of measurements from one or more measurement tools 1005. The controller 1025, memory 1035, and electronic apparatus 1065 can be realized to activate the measurement tool 1005 in accordance with measurement procedures and signal processing as described herein. Communications unit 1040 can include downhole communications in a drilling operation. Such downhole communications can include a telemetry system.

The system 1000 can also include a bus 1027, where bus 1027 provides electrical conductivity among the components of system 1000. Bus 1027 can include an address bus, a data bus, and a control bus, each independently configured. The bus 1027 can also use common conductive lines for providing one or more of address, data, or control, the use of which can be regulated by controller 1025. Bus 1027 can be configured such that the components of system 1000 are distributed. Such distribution can be arranged between downhole components such as transmitters and receivers of LWD tools and components, including components of measurement tool(s) 1005, can be disposed on the surface. Alternatively, the components can be co-located such as on one or more collars of a drill string or on a wireline structure.

In various embodiments, peripheral devices 1045 can include displays, additional storage memory, and/or other control devices that may operate in conjunction with controller 1025 and/or memory 1035. In an embodiment, controller 1025 is a processor. Peripheral devices 1045 arranged with a user display can be used with instructions stored in memory 1035 to implement a user interface to manage the operation of the measurement tool 1005 and/or components distributed within system 1000. The processing unit 1020 or memory 1035 can therefore provide data representative of rugosity, invasions, borehole diameter, or other formation features, for publication to the display. Such a user interface can be operated in conjunction with communications unit 1040 and bus 1027. Various components of system 1000 can be integrated with LWD tools such that processing identical to or similar to the processing schemes discussed with respect to various embodiments herein can be performed downhole in the vicinity of the measurement.

In an embodiment, the controller 1025 can be fabricated to include one or more processors. The display units 1055 can be fabricated or programmed to operate with instructions stored in the processing unit 1020 (for example in the memory 1035) to implement a user interface to manage the operation of the system 1000 or components distributed within the system 1000. This type of user interface can be operated in conjunction with the communications unit 1040 and the bus 1027. Various components of the system 1000 can be integrated with an associated housing such that processing identical to or similar to the methods discussed with respect to various embodiments herein can be performed downhole.

In various embodiments, a non-transitory machine-readable storage device can include instructions stored thereon, which, when performed by a machine, cause the machine to become a customized, particular machine that performs operations comprising one or more activities similar to or identical to those described with respect to the methods and techniques described herein. A machine-readable storage device, herein, is a physical device that stores information (e.g., instructions, data), which when stored, alters the physical structure of the device. Examples of machine-readable storage devices include, but are not limited to, memory 1035 in the form of read only memory (ROM), random access memory (RAM), a magnetic disk storage device, an optical storage device, a flash memory, and other electronic, magnetic, or optical memory devices, including combinations thereof.

The physical structure of stored instructions may thus be operated on by one or more processors such as, for example, the processing unit 1020. Operating on these physical structures can cause the machine to perform operations according to methods described herein. The instructions can include instructions to cause the processing unit 1020 to store associated data or other data in the memory 1035. The memory 1035 can store the results of measurements of formation parameters. The memory 1035 can store a log of the resistivity measurements obtained by the system 1000. The memory 1035 therefore may include a database, for example a relational database.

In some embodiments, the instructions can include instructions to cause the processing unit 1020 to perform operations including detecting rugosity in a borehole by identifying sections of the inverted log in which a radius of invasion into the borehole is below a threshold radius and in which in invasion resistivity is within a range of borehole mud resistivity; finding an effective borehole diameter, responsive to detecting rugosity in the borehole, for which a simulation of a model of the borehole using the effective borehole diameter generates simulation resistivity measurements that match, within a tolerance, resistivity measurements before execution of a borehole correction algorithm; and applying rugosity correction by generating resistivity logs that are corrected for borehole effect using the effective borehole diameter. The instructions can cause the processing unit 1020 to access rock property data to predict porosity at a suspected area of rugosity; determine a lower limit of invasion resistivity based on porosity at the suspected area of rugosity; and determine whether the suspected area of rugosity includes an actual rugosity feature when measured resistivity at the suspected area of rugosity is less than or equal to the expected invasion resistivity. The instructions can cause the processing unit 1020 to receive deep mode resistivity data from a deep mode component of an array laterolog tool, wherein the lower limit of invasion resistivity is further based on the deep mode resistivity data.

In embodiments, the instructions can cause the processing unit 1020 to perform operations including receiving an apparent borehole diameter from a caliper having a caliper pad length; storing an estimated rugosity value, responsive to detecting rugosity, that is less than the caliper pad length; and estimating a revised borehole diameter based at least in part on the estimated rugosity value and the deep mode resistivity value. The estimated rugosity value can be greater than a percentage of the length of the caliper pad, wherein the percentage of the length of the caliper pad is proportional to the apparent borehole diameter.

Thus, referring to FIGS. 1-10, it can be seen that many embodiments may be realized. For example, a system 1000 may comprise a tool (e.g., measurement tool(s) 1005) to provide measurements of a formation parameter, a caliper system including a caliper pad having a caliper pad length, and a processing unit 1020 to detect rugosity in a borehole by detecting sections of the borehole in which a radius of invasion into the borehole is below a threshold radius and in which in invasion resistivity is within a range of borehole mud resistivity. The processing unit 1020 can further operate to invert the corrected formation resistivity values and the corrected versions of the borehole-corrected apparent resistivity data to determine true resistivity values for the geological formation. The processing unit 1020 can also operate to find an effective borehole diameter, responsive to detecting rugosity, for which a simulation of a model of the borehole generates simulation resistivity measurements that match, within a tolerance, resistivity measurements before execution of a borehole correction algorithm. The processing unit 1020 can apply rugosity correction by generating resistivity logs that are corrected for borehole effect using the effective borehole diameter.

The system 1000 may include a bit steering mechanism. Thus, in some embodiments, the system 1000 comprises a bit steering device to operate in response to the true resistivity values determined by the processing unit 1020, to control drilling operations in the geological formation.

The tool may comprise a galvanic tool, such as a laterolog tool. Thus, in some embodiments of the system 1000, the at least one tool comprises an array laterolog tool.

The system 1000 and elements therein may all be characterized as "modules" herein. Such modules may include hardware circuitry, and/or a processor and/or memory circuits, software program modules and objects, and/or firmware, and combinations thereof, as desired by the architect of the system 1000, and as appropriate for particular implementations of various embodiments. For example, in some embodiments, such modules may be included in an apparatus and/or system operation simulation package, such as a software electrical signal simulation package, a power usage and distribution simulation package, a power/heat dissipation simulation package, a formation imaging package, an energy detection and measurement package, a resistivity measurement package, and/or a combination of software and hardware used to simulate the operation of various potential embodiments.

It should also be understood that the apparatus and systems of various embodiments can be used in applications other than for logging operations, and thus, various embodiments are not to be so limited. The illustrations of system 1000 are intended to provide a general understanding of the structure of various embodiments, and they are not intended to serve as a complete description of all the elements and features of apparatus and systems that might make use of the structures described herein. For example, some embodiments include a number of methods, which will now be described.

Drilling operations, such weight on bit or rotational rate of the bit, can be controlled based on the true resistivity values that have been determined. Thus, in some embodiments, methods can include controlling drilling operations in the geological formation based on the true, or corrected, resistivity values.

The controlled device may comprise a display, hardcopy printer, or storage device, among others. Thus, in some embodiments, example methods can include publishing at least some of the true resistivity values for the geological formation in a human-readable form.

A variety of mechanisms can be operated as the controlled device. Thus, in some embodiments, example methods can include controlling a bit steering device to select a drilling direction in the geological formation based on the true resistivity values for the geological formation.

It should be noted that the methods described herein do not have to be executed in the order described, or in any particular order. Moreover, various activities described with respect to the methods identified herein can be executed in iterative, serial, or parallel fashion. Information, including parameters, commands, operands, and other data, can be sent and received in the form of one or more carrier waves.

Upon reading and comprehending the content of this disclosure, one of ordinary skill in the art will understand the manner in which a software program can be launched from a computer-readable medium in a computer-based system to execute the functions defined in the software program. One of ordinary skill in the art will further understand the various programming languages that may be employed to create one or more software programs designed to implement and perform the methods disclosed herein.

For example, the programs may be structured in an object-orientated format using an object-oriented language such as Java or C#. In another example, the programs can be structured in a procedure-orientated format using a procedural language, such as assembly or C. The software components may communicate using any of a number of mechanisms well known to those skilled in the art, such as application program interfaces or interprocess communication techniques, including remote procedure calls. The teachings of various embodiments are not limited to any particular programming language or environment. Thus, other embodiments may be realized.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Various examples include:

Example 1 is a method for mud cake correction, the method comprising: detecting rugosity in a borehole; finding an effective borehole diameter, consistent with the presence of rugosity, for which a simulation of a model of the borehole using the effective borehole diameter generates simulation resistivity measurements that match, within a tolerance, resistivity measurements before execution of a borehole correction algorithm; and applying rugosity correction by generating resistivity logs that are corrected for borehole effect using the effective borehole diameter.

In Example 2, the subject matter of Example 1 further includes wherein detecting rugosity in the borehole comprises: identifying sections of an inverted log in which a radius of invasion into a formation is below a threshold radius and in which invasion resistivity is within a range of borehole mud resistivity.

In Example 3, the subject matter of Example 2 further includes determining a lower limit of invasion resistivity for use in detecting rugosity based on rock properties of the formation and on deep mode resistivity; and detecting rugosity when measured resistivity at an invasion zone is less than the lower limit of invasion resistivity.

In Example 4, the subject matter of Example 3 further includes wherein the threshold radius is about six inches.

In Example 5, the subject matter of Example 4 further comprises measuring a borehole diameter with a caliper having a caliper pad length, and wherein rugosity is defined with reference to the caliper pad length such that rugosity is smaller than the caliper pad length.

In Example 6, the subject matter of Example 5 further comprises wherein the rugosity is further defined with reference to the caliper pad length such that the rugosity is larger than a percentage of the caliper pad length, and wherein the percentage is specified to vary based on a diameter of the borehole.

In Example 7, the subject matter of Example 2 further comprises inspecting resistivity curves generated using the effective borehole diameter, and determining that rugosity correction accounts for rugosity in the borehole when resistivity curves for each measurement depth match within a range of each other.

In Example 8, the subject matter of Examples 7 further comprises determining that rugosity correction has been attained when the resistivity curves for each measurement depth are within 1% of each other.

In Example 9, the subject matter of Examples 1-8 further includes controlling a drilling operation based on the resistivity logs that have been corrected for rugosity and borehole effect.

Example 10 is a logging system comprising: a measurement tool configured to provide measurements of a formation parameter; and a processing unit coupled to the measurement tool and configured to detect rugosity in a borehole by detecting sections of the borehole in which a radius of invasion into the borehole is below a threshold radius and in which in invasion resistivity is within a range of borehole mud resistivity; find an effective borehole diameter, consistent with the presence of rugosity, for which a simulation of a model of the borehole using the effective borehole diameter generates simulation resistivity measurements that match, within a tolerance, resistivity measurements before execution of a borehole correction algorithm; and apply rugosity correction by generating resistivity logs that are corrected for borehole effect using the effective borehole diameter.

In Example 11, the subject matter of Example 10 further includes wherein the measurement tool is galvanic, and wherein the logging system further includes a caliper system including a caliper pad having a caliper length.

In Example 12, the subject matter of Examples 10-11 further includes wherein the measurement tool includes a laterolog.

In Example 13, the subject matter of Examples 10-12 further includes a user display configured to display data representative of the rugosity.

Example 14 is a processor-readable medium including instructions that, when executed on a processor, cause the processor to perform operations including: detecting rugosity in a borehole by detecting sections of the borehole in which a radius of invasion into the borehole is below a threshold radius and in which invasion resistivity is within a range of borehole mud resistivity; finding an effective borehole diameter, responsive to detecting rugosity in the borehole, for which a simulation of a model of the borehole using the effective borehole diameter generates simulation resistivity measurements that match, within a tolerance, resistivity measurements before execution of a borehole correction algorithm; and applying rugosity correction by generating resistivity logs that are corrected for borehole effect using the effective borehole diameter.

In Example 15, the subject matter of Example 14 further includes accessing rock property data to predict porosity at a suspected area of rugosity; determining a lower limit of invasion resistivity based on porosity at the suspected area of rugosity; and determining whether the suspected area of rugosity includes an actual rugosity feature when measured resistivity at the suspected area of rugosity is less than or equal to an expected invasion resistivity.

In Example 16, the subject matter of Example 16 further includes receiving deep mode resistivity data from a deep mode component of an array laterolog tool, and wherein the lower limit of invasion resistivity is further based on the deep mode resistivity data.

In Example 17, the subject matter of Example 16 further includes receiving an apparent borehole diameter from a caliper having a caliper pad length; storing an estimated rugosity value, responsive to detecting rugosity, that is less than the caliper pad length; and estimating a revised borehole diameter based at least in part on the estimated rugosity value and the deep mode resistivity data.

In Example 18, the subject matter of Example 17 further includes wherein the estimated rugosity value is greater than a percentage of the caliper pad length, wherein the percentage of the caliper pad length is proportional to the apparent borehole diameter.

In Example 19, the subject matter of Examples 14-18 further includes inspecting resistivity curves generated using the effective borehole diameter, and determining that rugosity correction accounts for rugosity in the borehole when resistivity curves for each measurement depth match within a range of each other.

In Example 20, the subject matter of Example 19 further includes determining that rugosity correction has been attained when data points of resistivity curves for each measurement depth are within a selected range of each other.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method, comprising:
    detecting rugosity in a borehole;
    finding an effective borehole diameter, consistent with the presence of rugosity, for which a simulation of a model of the borehole using the effective borehole diameter generates simulation resistivity measurements that match, within a tolerance, resistivity measurements before execution of a borehole correction algorithm; and
    applying rugosity correction by generating resistivity logs that are corrected for borehole effect using the effective borehole diameter.

2. The method of claim 1, wherein detecting rugosity in the borehole comprises:
    identifying sections of an inverted log in which a radius of invasion into a formation is below a threshold radius and in which invasion resistivity is within a range of borehole mud resistivity.

3. The method of claim 2, further comprising:
determining a lower limit of invasion resistivity for use in detecting rugosity based on rock properties of the formation and on deep mode resistivity; and
detecting rugosity when measured resistivity at an invasion zone is less than the lower limit of invasion resistivity.

4. The method of claim 2, wherein the threshold radius is about six inches.

5. The method of claim 2, further comprising:
measuring a borehole diameter with a caliper having a caliper pad length, and wherein rugosity is defined with reference to the caliper pad length such that rugosity is smaller than the caliper pad length.

6. The method of claim 5, wherein the rugosity is further defined with reference to the caliper pad length such that the rugosity is larger than a percentage of the caliper pad length, and wherein the percentage is specified to vary based on a diameter of the borehole.

7. The method of claim 2, further comprising:
inspecting resistivity curves generated using the effective borehole diameter, and determining that rugosity correction accounts for rugosity in the borehole when resistivity curves for each measurement depth match within a range of each other.

8. The method of claim 7, further comprising:
determining that rugosity correction has been attained when the resistivity curves for each measurement depth are within 1% of each other.

9. The method of claim 1, further comprising:
controlling a drilling operation based on the resistivity logs that have been corrected for rugosity and borehole effect.

10. A logging system comprising:
a measurement tool configured to provide measurements of a formation parameter; and
a processing unit coupled to the measurement tool and configured to:
detect rugosity in a borehole by detecting sections of the borehole in which a radius of invasion into the borehole is below a threshold radius and in which invasion resistivity is within a range of borehole mud resistivity;
find an effective borehole diameter, consistent with the presence of rugosity, for which a simulation of a model of the borehole using the effective borehole diameter generates simulation resistivity measurements that match, within a tolerance, resistivity measurements before execution of a borehole correction algorithm; and
apply rugosity correction by generating resistivity logs that are corrected for borehole effect using the effective borehole diameter.

11. The logging system of claim 10, wherein the measurement tool is galvanic, and wherein the logging system further includes a caliper system including a caliper pad having a caliper length.

12. The logging system of claim 11, wherein the measurement tool includes a laterolog.

13. The logging system of claim 10, further comprising a user display configured to display data representative of the rugosity.

14. A machine-readable storage device including instructions that, when executed on a processor, cause the processor to perform operations including:
detecting rugosity in a borehole by detecting sections of the borehole in which a radius of invasion into the borehole is below a threshold radius and in which invasion resistivity is within a range of borehole mud resistivity;
finding an effective borehole diameter, responsive to detecting rugosity in the borehole, for which a simulation of a model of the borehole using the effective borehole diameter generates simulation resistivity measurements that match, within a tolerance, resistivity measurements before execution of a borehole correction algorithm; and
applying rugosity correction by generating resistivity logs that are corrected for borehole effect using the effective borehole diameter.

15. The machine-readable storage device of claim 14, including further instructions that, when executed on the processor, cause the processor to perform operations including:
accessing rock property data to predict porosity at a suspected area of rugosity;
determining a lower limit of invasion resistivity based on porosity at the suspected area of rugosity; and
determining whether the suspected area of rugosity includes an actual rugosity feature when measured resistivity at the suspected area of rugosity is less than or equal to an expected invasion resistivity.

16. The machine-readable storage device of claim 15, including further instructions that, when executed on the processor, cause the processor to perform operations including:
receiving deep mode resistivity data from a deep mode component of an array laterolog tool, and wherein the lower limit of invasion resistivity is further based on the deep mode resistivity data.

17. The machine-readable storage device of claim 16, having further instructions stored thereon, which, when performed by the processor, cause the processor to perform operations comprising:
receiving an apparent borehole diameter from a caliper having a caliper pad length;
storing an estimated rugosity value, responsive to detecting rugosity, that is less than the caliper pad length; and
estimating a revised borehole diameter based at least in part on the estimated rugosity value and the deep mode resistivity data.

18. The machine-readable storage device of claim 17, wherein the estimated rugosity value is greater than a percentage of the caliper pad length, wherein the percentage of the caliper pad length is proportional to the apparent borehole diameter.

19. The machine-readable storage device of claim 15, having further instructions stored thereon, which, when performed by the processor, cause the processor to perform operations comprising:
inspecting resistivity curves generated using the effective borehole diameter, and determining that rugosity correction accounts for rugosity in the borehole when resistivity curves for each measurement depth match within a range of each other.

20. The machine-readable storage device of claim 19, having further instructions stored thereon, which, when performed by the processor, cause the processor to perform operations comprising:
determining that rugosity correction has been attained when data points of resistivity curves for each measurement depth are within a selected range of each other.

* * * * *